(12) United States Patent
Ben Nun et al.

(10) Patent No.: US 6,950,393 B1
(45) Date of Patent: Sep. 27, 2005

(54) METHOD AND APPARATUS FOR PROCESS FLOW RANDOM EARLY DISCARD IN SERVICE AWARE NETWORKING SYSTEMS

(75) Inventors: Michael Ben Nun, Ramat Hasharon (IL); Reuven A Marko, Netanya (IL)

(73) Assignee: P-Cube, Ltd., Herzelia (IL)

( * ) Notice: Subject to any disclaimer, the term of this patent is extended or adjusted under 35 U.S.C. 154(b) by 995 days.

(21) Appl. No.: 09/717,290

(22) Filed: Nov. 22, 2000

(51) Int. Cl.⁷ .......................... H04L 12/26; G06F 15/16
(52) U.S. Cl. ..................... 370/229; 370/235; 709/229; 709/232
(58) Field of Search ................ 370/229–236, 370/395.4, 412–419, 428, 400–402; 709/232–235, 709/238, 241; 714/748–750

(56) References Cited

U.S. PATENT DOCUMENTS

| | | | |
|---|---|---|---|
| 4,414,644 A | 11/1983 | Tayler | 364/900 |
| 4,616,359 A | 10/1986 | Fontenot | 370/60 |
| 5,042,029 A | 8/1991 | Hayakawa | 370/60 |
| 5,050,162 A | 9/1991 | Golestani | 370/60 |
| 5,067,127 A | 11/1991 | Ochiai | 370/58.1 |
| 5,090,011 A | 2/1992 | Fukuta et al. | 370/60 |
| 5,167,033 A | 11/1992 | Bryant et al. | 395/575 |
| 5,193,151 A | 3/1993 | Jain | 395/200 |
| 5,400,329 A | 3/1995 | Tokura et al. | 370/84 |
| 5,444,706 A | 8/1995 | Osaki | 370/94.1 |
| 5,463,620 A | 10/1995 | Sriram | 370/60 |
| 5,473,604 A | 12/1995 | Lorenz et al. | 370/60 |
| 5,646,943 A | 7/1997 | Elwalid | 370/230 |
| 5,650,993 A | 7/1997 | Lakshman et al. | 370/236 |
| 5,742,239 A | 4/1998 | Siloti | 340/825.5 |
| 5,757,770 A | 5/1998 | Lagoutte et al. | 370/229 |
| 5,764,641 A | 6/1998 | Lin | 370/412 |
| 5,781,545 A | 7/1998 | Matthew | 370/389 |
| 5,805,577 A | 9/1998 | Jain et al. | 370/234 |
| 5,901,138 A | 5/1999 | Bader et al. | 370/229 |
| 5,936,939 A | 8/1999 | Des Jardins et al. | 370/229 |
| 5,936,940 A | 8/1999 | Marin et al. | 370/232 |
| 6,075,769 A | 6/2000 | Ghanwani et al. | 370/229 |
| 6,292,489 B1 * | 9/2001 | Fukushima et al. | 370/401 |
| 6,463,068 B1 * | 10/2002 | Lin et al. | 370/414 |
| 6,535,482 B1 * | 3/2003 | Hadi Salim et al. | 370/229 |
| 6,542,466 B1 * | 4/2003 | Pashtan et al. | 370/235 |
| 6,608,816 B1 * | 8/2003 | Nichols | 370/235 |
| 6,628,610 B1 * | 9/2003 | Waclawsky et al. | 370/229 |
| 6,633,540 B1 * | 10/2003 | Raisanen et al. | 370/230.1 |

(Continued)

*Primary Examiner*—Steven Nguyen
(74) *Attorney, Agent, or Firm*—Abelman, Frayne & Schwab

(57) ABSTRACT

A packet transfer apparatus for a network system is disclosed. The apparatus comprises a packet receiver that accepts an input of packets from a first network segment, a packet classifier that classifies packets based on their respective process flows, a packet discarder to discard packets and a packet sender that sends packets to a second network segment. Another aspect of the invention is a network system comprising a plurality of terminal nodes, at least one packet transfer unit effectively connected between at least two of said terminal nodes, said at least one transfer unit further comprising a packet classifier that classifies packets into their respective process flows. Yet another aspect of the invention is a method of transferring packets in a network comprising accepting an input of packets from a first network segment, classifying the packets based on their process flows, providing a unique process flow identification to packets belonging to a same process flow, discarding at least a packet, providing information to a packet classifier regarding the discarded packets, and stopping further transfer of packets having a same PFID as the discarded packet.

19 Claims, 5 Drawing Sheets

U.S. PATENT DOCUMENTS 6,647,424 B1 * 11/2003 Pearson et al. ............. 370/235
6,654,374 B1 * 11/2003 Fawaz et al. ............... 370/412
6,657,962 B1 * 12/2003 Barri et al. ................. 370/235
6,714,517 B1 * 3/2004 Fawaz et al. ............... 370/236
6,788,697 B1 * 9/2004 Aweya et al. ............... 370/412

* cited by examiner

| Source IP Address | Destination IP Address | Protocol Field | Source Port | Destination Port |
|---|---|---|---|---|
| 32 bit | 32 bit | 8 bits | 16 bits | 16 bits |

FIG. 2

METHOD AND APPARATUS FOR PROCESS FLOW RANDOM EARLY DISCARD IN SERVICE AWARE NETWORKING SYSTEMS

I. DESCRIPTION OF THE INVENTION

I.A. Field of the Invention

The present invention relates generally to the congestion monitoring and processing of packets in a full duplex communication system. Specifically, the present invention is related to systems where Random Discard (RED) mechanisms provide for a better network overall throughput. More specifically the invention relates to the implementation of service aware network router (SAN-R). The present invention is embodied in a packet transfer apparatus for a network system; a network system; and methods for transferring packets in a network.

I.B. Background of the Invention

Packets of data, flowing between a network of computers, carry portions of digital information between different nodes in the network. Such a network is described schematically in FIG. 1. Most generally, the results of an application running at one node 110, may be sent to a computer at another network node 130. In order to establish the transfer of data related to the application between the nodes 110 and 130, the information is split into packets and sent over the network. Communication protocols in a full duplex connection may simultaneously exchange packets. Therefore, the same session may include packets that flow both upstream and downstream. The packets are routed throughout the network by passing through a plurality of routers. One such router is router 120. The packets are finally routed to their destination.

Various protocols are used to transmit packets through the network. Transmission Control Protocol (TCP) is a popularly used protocol. In TCP, packets are sent in bursts of data of a pre-determined size. The size of packets used in TCP increase linearly over time. TCP uses a mechanism in which the sender sends an agreed amount of data, called the Window-size, to the receiver. After receiving the data, the recipient sends an acknowledgement to the sender. If the sender does not receive an acknowledgment from the recipient, it will stop sending more data. The sender starts with a relatively small window-size and increases the window-size linearly. The size is increased as long as the network is not congested. The occurrence of congestion is determined when packets that are sent do not reach the recipient. For example, the data transmission may begin with a window-size of 4 kilobytes (KB). As long as the system allows, the source increases the window-size by a defined number of bytes each time (for example 1 KB). In this example if the original window-size is 4 KB, the next window-size will be 5 KB, followed by a 6 KB, thus continually increasing the size in a linear fashion. The quantum of increase is a parameter that may be set based on system requirements.

Each packet contains a packet header. The packet header contains the sending and receiving node addresses, the sending and receiving port numbers, and the type of protocol used for the data transmission. An example of a packet header is shown in FIG. 3. Such a header is also called the tuple.

When multiple nodes send data packets and with linearly increasing window-size of data, eventually the network becomes congested. When such a congestion occurs, one or more of the routers are unable to handle the traffic passing through the router at a given instance of time.

Paxon and Floyd describe this phenomenon in their paper "Wide Area Traffic: The Failure of Poisson Modeling" IEEE/ACM Transactions on Networking, 3, pp. 226–244, 1995 which is hereby incorporated by reference. Paxon and Floyd claim that the behavior of congested systems is not simple and cannot be dealt with in a simplistic manner. In fact, network traffic, in reality, "spikes" causing actual losses of packets. These so-called "spikes" ride on top of a longer-term ripple, which in turn ride on even longer term swells. In other words, the traffic rates do not simply rise to a level, stay there a while, and then subside. Rather, these periods of congestion can be relatively long and with significant losses of data during the congestion period. Paxon and Floyd suggest that Poisson models do not explain the traffic well. This can be easily understood from the fact that a linear increase of buffer sizes does not result in a large decrease in a packet drop rate using the Poisson model.

With networks being unpredictable during periods when load levels grow, it can be extremely difficult to design systems that handle the traffic efficiently. In practice when a network system reaches full load, all packets are dropped until system resources are available again. This translates into a significant and abrupt drop of overall system performance. Because of the delay associated with the way conventional networks operate, packets that are sure to be retransmitted still continue to flow through the network system. In a high speed network system, a gigabit of information might continue to suffer from the congestion related packet drops even though the system might already have been able to free resources if unnecessary packets had not continued to flow through the congested network.

Congestion avoidance techniques are used to help prevent the problems related to the sudden loss of data resulting in overflow of transmission buffers. The techniques are based on the way TCP handles packet loss. When the TCP receiver receives a data segment, it checks its 32-bit sequence number against the number it expected to receive. If all previous packets were received, then the data segment has arrived with no problems. In such a case, the data is delivered to the target application and an acknowledgement is sent to the sender. However, if a data packet is not received, a request to resend the data is issued. The sender then re-sends the missing packets starting from the packet immediately following the last packet acknowledged by the recipient. In addition, the sender adjusts the Window-size to half, which reduces the transmission rate that was previously used to send the data. In such a technique, congestion level of the system is reduced by reducing the bandwidth requirements of the specific process flow. While this is a reasonable response to a network congestion situation, this may result in an immediate drop in utilization of the network. The utilization may be reduced up to half of its original load at the time when the situation leading to the congestion first occurred. This will happen in a very short period of time. Recovery is relatively long because, while the step-down is divisional the step-up is additive, which is naturally slower.

In order to prevent this from happening, the Random Early Discard (RED) mechanism was developed in the early 1990s based on a proposal by Floyd and Jacobson, reported in "Random Early Detection Gateways for Congestion Avoidance," *IEEE/ACM Transactions on Networking*, Vol. 1, No. 4, August 1993, which is hereby incorporated by reference. In RED, the idea was to be proactive rather than responsive to congestive situations. It is based on the notion that, in most cases, the behavior of the data transport will respond by slowing down data rate transmission in response to data segment loss. By monitoring the buffers in the router, the RED detects a potential congestion as load on the buffer increases. This is readily seen when the buffer gets closer to being filled up. By randomly dropping a packet prior to a time of high congestion, but when a congestion can be predicted to occur, the RED indicates to the source transmitting the data to reduce its transmission rate.

The advantage of TCP is that not only does it respond to the implied request to decrease the data rate, but also that it is capable of returning to a higher data rate once the congestion has been relieved, as explained above. Weighted Random Early Detect (WRED) adds another dimension to the application of this method. While RED impacts relatively more frequently those process flows which are most demanding on the system, WRED takes in consideration the assigned weight, or importance of the packet. By using the Internet Protocol (IP) Precedence capability, WRED gives priority, or provides preferential treatment to certain packets by reducing their relative chance of being dropped. WRED, thus provides differentiated performance characteristics to lower priority packets versus the characteristics of higher priority packets. By applying early detection techniques to congested networks, the situation where multiple packets have to be dropped because the buffer is full is avoided.

A basic block diagram for such a router is shown in FIG. 3. The router 300 receives a flow of input packets 310 from the network. These are classified individually by the classifier 320. The classification is performed solely at the level of the individual packet. The classification is done based on the tuple described in FIG. 2. The classified packet is transferred to the discard test unit (DTU) 330 which performs the required WRED tests based on the load of the buffer 340. If necessary, a packet may be discarded, and therefore, not transmitted to the buffer. Packets which were sent to the buffer are placed in the transmit queue 350 prior to sending them back onto the network for the continuation of their transmit towards their final destination.

A variety of conventional techniques exist in the area of early packet discard (EPD) and various implementations of RED and WRED. U.S. Pat. Nos. 4,414,644, 4,616,359, 5,444,706, 5,463,620 and 5,936,939, deal with implementations of early discard of packets from a variety of implementations of buffers. Fairness mechanisms are also discussed in these references. These mechanisms ensure that packets are effected fairly from the discard process, so that eventually all packets get to their destination. U.S. Pat. Nos. 5,193,151, 5,742,239, 5,805,577 and 5,936,940, deal with issues of measurements of delays and other elements of a network system which when implemented can reduce congestion. Ways of notifying congestion in the system are discussed in U.S. Pat. Nos. 5,042,029, 5,090,011 and 5,167,033.

By either making an acknowledgment of receipt to the destination or source or by adding a congestion signal or bit to the packet, these solutions allow for the indication of congestion and letting the source reduce the transfer rate. Signaling between units in the network in order to provide notification of congestion situations and require specific actions has also been discussed in several references. While U.S. Pat. Nos. 5,050,162 and 6,075,769 deal with indications directed at the source of the network traffic, U.S. Pat. Nos. 5,650,993 and 5,901,138 provide indications to both the source and the destination alike. U.S. Pat. Nos. 5,473, 604, 5,757,770 and 5,781,545 deal with the node effects either within the node or in between the network nodes.

Takura et al describe in U.S. Pat. No. 5,400,329 (hereinafter '329) a packet network and method for congestion avoidance. The technique disclosed in '329 is claimed to have the capability of avoiding "the generation of new packets when signal congestion is predicted". When a congestion is detected, the system disclosed in '329 issues a "suspend packet transfer signal" resulting in the temporary suspension of all packet transfers from the "transmitting modals" until the congestion is relieved as indicated by the "packet transfer signal". In U.S. Pat. No. 5,764,641 (hereinafter '641) Lin suggests a method for an # asynchronous transfer mode (ATM) system that uses an EPD technique in combination with a technique that discards cells that create the specific packet that is transferred over ATM. In ATMs, the packets are broken down into basic cells and transferred over the transmission lines. If a packet is to be discarded then it would make no sense to continue to load the system with additional cells which are part of that packet onto the ATM network. Therefore '641 teaches a method of discarding these cells from transmission over the ATM network.

Once a packet belonging to a certain process flow has been dropped due to any kind of early detection and discard method, other packets that belong to the same process flow might still be transmitted. However, all these following packets will have to be retransmitted once the destination realizes that a packet drop has occurred. Even the router that has dropped the packet continues to send subsequent packets belonging to the same process flow, even though transmitting these packets is merely a waste of available bandwidth and other resources. This behavior causes a deterioration in the performance of the congested network, as well as an inaccurate handling of the load situation. This deterioration continues until such time when the source detects the congested situation and responds with sending data segments in a decreased data rate. Because of these problems, the overall improvement in the system efficiency is delayed, and overall utilization of the network is not optimal.

II. SUMMARY OF THE INVENTION

An object of the present invention is to describe an apparatus and a method capable of suspending the transfer of packets, and discarding such packets, belonging to a process flow, after a packet from such process flow is dropped by means of an early discard mechanism, thereby improving overall system performance and efficiency.

To meet the objects there is provided a packet transfer apparatus for a network system said apparatus comprising a packet receiver that accepts an input of packets from a first network segment, a packet classifier that classifies packets based on their respective process flows, a packet discarder to discard packets, and a packet sender that sends packets to a second network segment.

Preferably, the network packet transfer unit is a router.

Preferably, the network packet transfer unit is a switch.

Preferably, the apparatus is further capable of providing a unique process flow identification (PFID) to all packets belonging to a same process flow.

Still preferably, the apparatus further compromises a feedback mechanism between the packet discarder and the packet classifier.

Still preferably, the packet classifier can be provided information regarding discarded packets.

Still preferably, after receiving information about a discarded packet, the packet classifier stops transferring to a random early detector (RED) any further packets having the same PFID as that of the discarded packet.

Still preferably, only packets having the same PFID and a packet sequence number higher than a packet sequence number of the discarded packet are not transferred to the RED.

Still preferably, the apparatus is capable of resuming sending packets upon detecting a retransmit of the discarded packet.

Still preferably, the detecting is based on the packet sequence number of the discarded packet.

Still preferably, the apparatus sends an acknowledgement packet, said acknowledgement being sent from a destination of the discarded packet to a source of the discarded packet, said acknowledgement containing a sequence number of the discarded packet.

Still preferably, the apparatus is capable of ignoring the acknowledgment packet.

Still preferably, the apparatus is capable of measuring an elapsed time between the discarding of the packet and a time immediately prior to receipt of the acknowledgment packet.

Still preferably, the apparatus is capable of setting a threshold time that is compared against the elapsed time.

Still preferably, the acknowledgment packet is not transferred when the time threshold is larger than the elapsed time.

Still preferably, the acknowledgment packet is transferred when the time threshold is equal to or smaller than the elapsed time.

Still preferably, upon receiving information of a discarded packet, only one more packet is sent to the RED, after which the process flow classifier ceases to transfer any further packets having the same PFID as that of the discarded packet.

Still preferably, the apparatus is capable of resuming sending of packets upon detection of a retransmit of the discarded packet.

Still preferably, the apparatus is capable of ignoring an acknowledgment packet transmitted from the destination to the source requesting the retransmit of the discarded packet.

Still preferably, the apparatus is capable of measuring an elapsed time between the discarding of the packet and a time immediately prior to receipt of the acknowledgment packet from the destination.

Still preferably, the apparatus is capable of setting a time threshold that is compared against the elapsed time.

Still preferably, a second packet is not transferred when the time threshold is larger than the elapsed time.

Still preferably, a second packet is transferred when the time threshold is equal to or smaller than the elapsed time.

Still preferably, the one more packet is a next immediately available packet having the same PFID.

Preferably, early discard of packets is performed by randomly discarding packets.

Preferably, early discard of packets is performed by a weighted random early discard technique.

Preferably, the apparatus is further capable of detecting an acknowledgment packet from the destination.

Still preferably, the apparatus is further capable of identifying packets using their process flow identification (PFID).

Still preferably, the apparatus is further capable of ceasing a transfer of packets having the same PFID.

Still preferably, the apparatus is further capable of ceasing transfer of packets having the same PFID from a source to a destination.

Still preferably, the apparatus is further capable of resuming transfer of packets with the same PFID when a retransmit request for the packet is detected.

Still preferably, the apparatus is further capable of extracting a packet sequence number from the acknowledgment packet.

Still preferably, the apparatus is further capable of ceasing transmission of packets from the source to the destination having the same PFID and a packet sequence number larger than that of the extracted packet sequence number.

Still preferably, the apparatus is further capable of resuming transmission of packets with the same PFID when retransmit of the packet requested is detected. Another aspect of the present invention is a network system comprising a plurality of terminal nodes, at least one packet transfer unit effectively connected between at least two of said terminal nodes, said at least one transfer unit further comprising a packet classifier that classifies packets into their respective process flows.

Preferably, the network packet transfer unit is a router.

Preferably, the network packet transfer unit is a switch.

Preferably, the packet transfer unit is capable of providing a unique process flow identification (PFID) to all packets belonging to a same process flow.

Preferably, the network system further compromises a random early discarder (RED) of packets.

Preferably, the network system further compromises a feedback mechanism between the RED and the packet classifier.

Still preferably, the packet classifier can be provided information regarding discarded packets.

Still preferably, after receiving information about a discarded packet, the packet classifier stops transferring to the RED any further packets having the same PFID as that of the discarded packet.

Still preferably, only packets having the same PFID and a packet sequence number higher than a packet sequence number of the discarded packet are not transferred to the RED.

Still preferably, the network system is capable of resuming sending packets on detecting a retransmit of the discarded packet.

Still preferably, the detecting is based on the packet sequence number of the discarded packet.

Still preferably, the system sends an acknowledgement packet, said acknowledgement packet being sent from a destination of the discarded packet to a source of the discarded packet, said acknowledgement containing a sequence number of the discarded packet.

Still preferably, the system is capable of ignoring the acknowledgment packet.

Still preferably, the system is capable of measuring an elapsed time between the discarding of the packet and a time immediately prior to receipt of the acknowledgment packet.

Still preferably, the system is capable of setting a threshold time that is compared against the elapsed time.

Still preferably, the acknowledgment packet is not transferred when the threshold time is larger than the elapsed time.

Still preferably, the acknowledgment packet is transferred when the threshold time is equal to or smaller than the elapsed time.

Still preferably, upon receiving information of a discarded packet, only one more packet is sent to the RED, after which the packet flow classifier ceases to transfer any further packets having the same PFID as that of the discarded packet.

Still preferably, the network system capable of resuming sending of packets upon detection of retransmit of the discarded packet.

Still preferably, the system is capable of ignoring an acknowledgment packet transmitted from the destination to the source requesting the retransmit of the discarded packet.

Still preferably, the system is capable of measuring the elapsed time between the discarding of the packet and a time immediately prior to receipt of an acknowledgment packet from the destination.

Still preferably, the system is capable of setting a time threshold that is compared against the elapsed time.

Still preferably, a second packet is not transferred when the time threshold is larger than the elapsed time.

Still preferably, a second packet is transferred when the time threshold is equal to or smaller than the elapsed time.

Still preferably, the one more packet is a next immediately available packet having the same PFID.

Preferably, the early discard of packets is performed by randomly discarding packets.

Preferably, early discard of packets is performed by a weighted random early discard technique.

Preferably, the network system is further capable of detecting an acknowledgment packet from the destination.

Still preferably, the system is capable of identifying packets using their PFID.

Still preferably, the system is capable of ceasing a transfer of packets having the same PFID.

Still preferably, the system is further capable of ceasing transfer of packets from a source to a destination having the same PFID.

Still preferably, the system is further capable of resuming transfer of packets with the same PFID when a retransmit request for the packet is detected.

Still preferably, the system is further capable of extracting a packet sequence number from the acknowledgment packet.

Still preferably, the system is further capable of ceasing transmission of packets from the source to the destination having the same PFID and a packet sequence number larger than that of the extracted packet sequence number.

Still preferably, the system is further capable of resuming transmission of packets with the same PFID when retransmit of the packet requested is detected.

Another aspect of the present invention is a method of transferring packets in a network comprising accepting an input of packets from a first network segment, classifying the packets based on their process flows, providing a unique process flow identification to packets belonging to a same process flow, discarding at least a packet, providing information to a packet classifier regarding the discarded packet and stopping further transfer of packets having a same PFID as the discarded packet.

Preferably, only packets of the same PFID and a packet sequence number higher than a packet sequence number of the discarded packet are not transferred.

Preferably, the method further comprises resuming sending packets on detecting a retransmit of the discarded packet.

Still preferably, said detecting is based on the packet sequence number of the discarded packet.

Preferably, the method further comprises sending an acknowledgement packet to the source of the discarded packet, said acknowledgement containing a sequence number of the discarded packet.

Preferably, the method further comprises ignoring the acknowledgment packet transmitted from the destination to the source requesting the retransmit of the discarded packet.

Preferably, the method further comprises measuring an elapsed time between the discard of the packet and a time immediately prior to receipt of the acknowledgment packet.

Preferably, the method further comprises setting a threshold time that is compared against the elapsed time.

Preferably, the method further comprises not transferring the acknowledgement packet when the time threshold is larger that the elapsed time and transferring when the time threshold is equal to or smaller than the elapsed time.

Preferably, the method further comprises upon receiving information of a discarded packet, sending only one more packet to a random early discarder (RED), after which ceasing to transfer any further packets having the same PFID as that of the discarded packet.

Still preferably, the method further comprises resuming sending of packets upon detection of retransmit of the discarded packet.

Still preferably, the method further comprises measuring an elapsed time between the discard of packet and a time immediately prior to receipt of the acknowledgment packet.

Still preferably, the method further comprises setting a time threshold that is compared against the elapsed time.

Still preferably, the method further comprises transferring a second packet when the time threshold is larger than the elapsed time and not transferring the second packet when the time threshold is equal to or smaller than the elapsed time.

Preferably, the method further comprises detecting an acknowledgment packet from the destination.

Still preferably, the method further comprising identifying the packet using its PFID.

Preferably, random early discard (RED) is the method used for discarding a packet.

Preferably, weighted random early discard (WRED) is the method used for discarding a packet.

III. BRIEF DESCRIPTION OF THE DRAWINGS

The above objectives and advantages of the present invention will become more apparent by describing in detail preferred embodiments thereof with reference to the attached drawings in which:

FIG. 2 shows a network tuple.

IV. DETAILED DESCRIPTION OF THE PREFERRED EMBODIMENT

Figure 1:
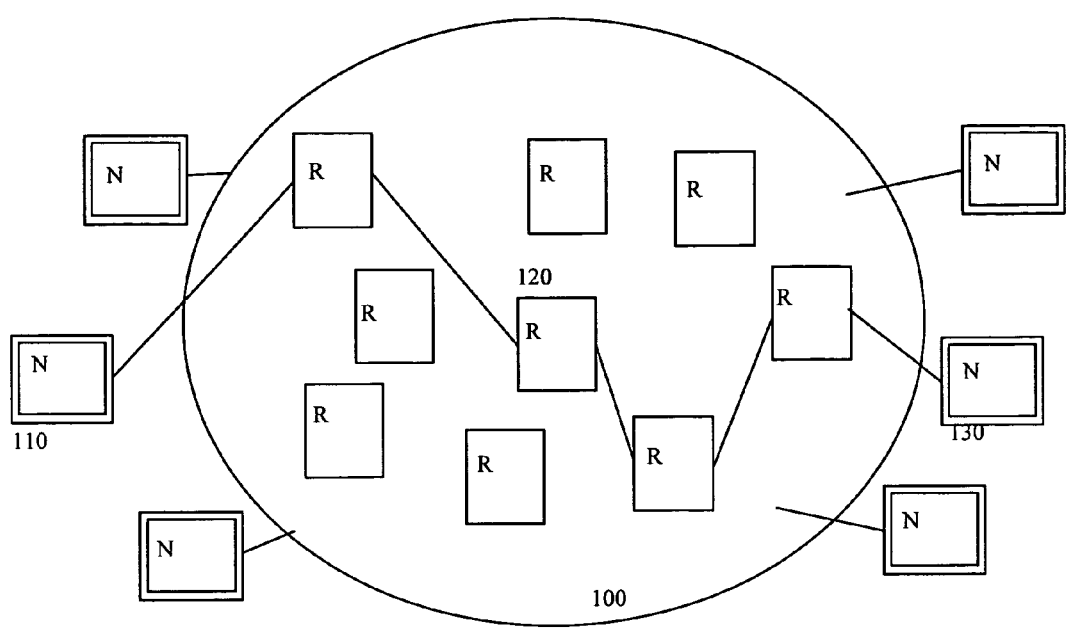
FIG. 1 shows a network connecting end-nodes via routers and switches.
Figure 3:
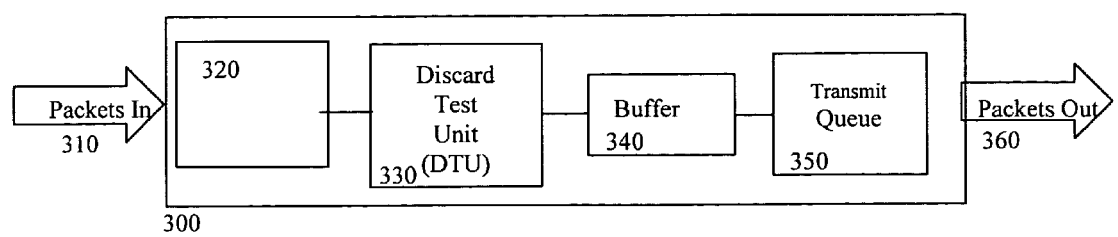
FIG. 3 shows a conventional router system with random early discard (RED).
Figure 4:
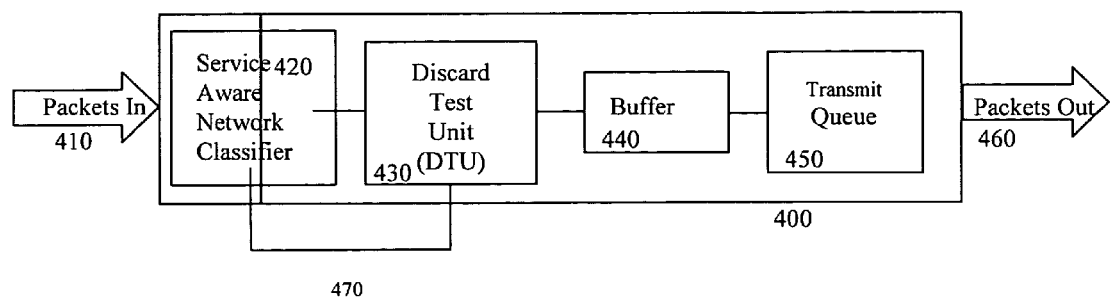
FIG. 4 shows a service ware network router (SAN-R) according to the present invention.

The preferred embodiment is described using a policy-based network. In such a network, the router is modified by enhancing the classifier capabilities of a conventional classifier by implementing a service aware network classifier (SAN-C) according to the present invention. Thus, a service aware network router (SAN-R) according to the present invention is created. Using the SAN-C system, instead of the traditional packet level classifier, the SAN-R ceases the transfer of packets belonging to the same process flow, subsequent to the drop of a packet belonging to the same process flow. By doing so the overall system performance is enhanced. FIG. 4 describes the SAN-R 400 using the SAN-C 420 to determine packets belonging to the same process flow. Packets 410 are input to the SAN-C unit of the SAN-R and classified to the specific process flow they belong to based on the tuple information described in FIG. 2.

The DTU 430, implementing a conventional random early discard (RED) or conventional weighted RED (WRED) mechanism provides feedback 470 to the SAN-C that marks the process flow information relative to such packet. From thereon, and until such time that the packet dropped is retransmitted by the source node, no packet belonging to the same process flow is transmitted. The buffer 440, therefore does not experience additional load from the specific process flow. Therefore, this buffer is immediately relieved from the congestive situation experienced by the network. The destination, not receiving the packets as required sends a notification of such a situation to the source, after waiting a predetermined amount of time. This results in a retransmit of the missing packets starting from the dropped packet.

In another embodiment of the present invention, instead of immediately ceasing the sending of packets belonging to the same flow subsequent to a packet drop, the SAN-R sends the first packet it received from the specific process flow after such packet drop has occurred. If the DTU drops that packet too, another one will be sent until at least one has been sent, or a time limit has exceeded. The destination node, detecting an out of sequence packet responds immediately with a request for a retransmit from the missing packet therefore further increasing the recovery speed of the network system.

Figure 5:
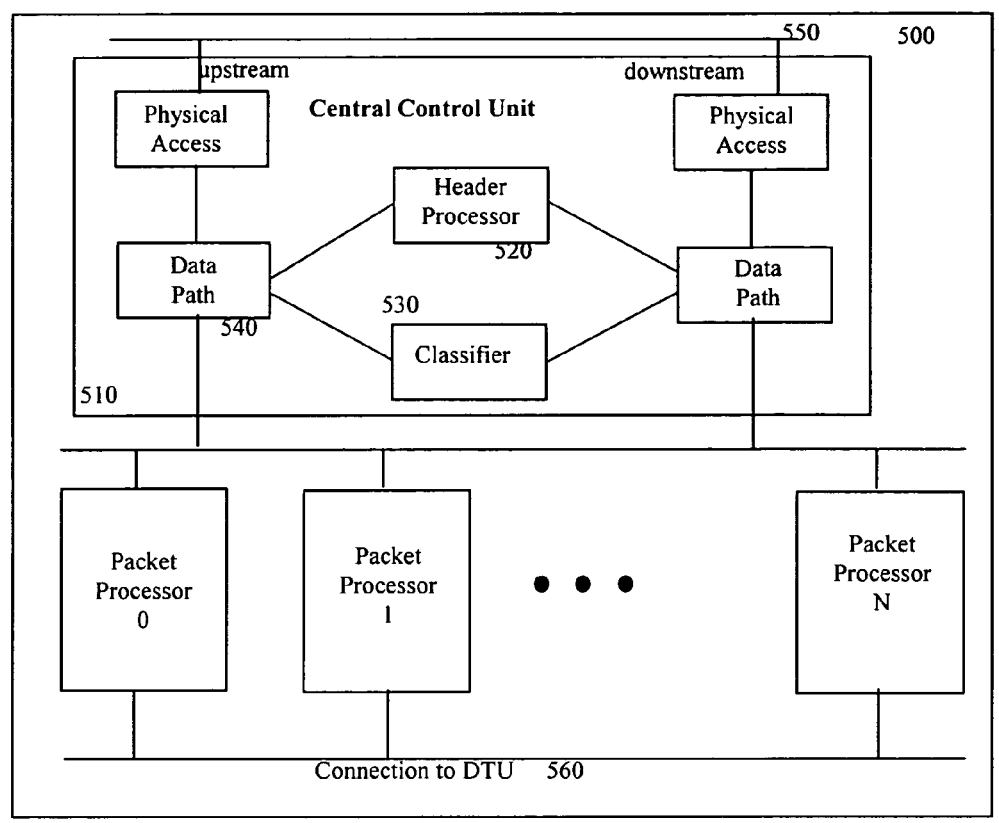
FIG. 5 shows a service aware network classifier (SAN-C) according to the present invention.

The basic SAN-C system, described in FIG. 5, comprises the subject matter of two separate inventions disclosed in U.S. patent application Ser. No. 09/541,598 titled "An Apparatus for Wire-Speed Classification and Pre-Processing of Data Packets in a Full Duplex Network" and U.S. patent application Ser. No. 09/547,034 titled "A Method and Apparatus for Wire-Speed Application Layer Classification of Data Packets" invented by Michael Ben-Nun, Sagi Ravid, Offer Weil and Michael Ben Nun, Sagi Ravid, Itzhaki Barak, Offer Weil, respectively, both assigned to P-Cube Ltd. and both of which are incorporated herein by reference. In addition, U.S. patent application Ser. No. 09/515,848 titled "A Modified Content Addressable Memory Capable of High Speed Multiple Span Matching" invented by Michael Ben-Nun and assigned to P-Cube Ltd. is also hereby incorporated herein by reference. For the sake of simplification these inventions are not discussed herein, unless when required to specifically explain this invention. However, the present invention system is an enhancement of these inventions that adds the capabilities of ceasing the transfer of packets of previously discarded packets due to an implementation of the conventional RED system.

The SAN-C system described herein is capable of identifying packets belonging to the same process flows as described in detail in the inventions mentioned above. Once a new process flow is identified, it receives a unique process flow identification (PFID) that is used to reference subsequent packets belonging to the same process flow. The SAN-C system of FIG. 5 is enhanced with a capability that allows it to prevent the transmission of a packet based on feedback provided to the header processor 520 and the classifier 530. Moreover, it shows this capability performed in a full duplex network. It should be clear to a skilled practitioner that the present technique can be extended to half duplex systems too.

When a packet arrives to the unit 500 on the network connection 550, the physical access unit transfers the packet to the data path 540. The packet is further processed by the header processor 520 and classifier 530 as described above, and in the referenced inventions. A packet belonging to a new process receives a new PFID and all subsequent packets belonging to the same process flow will bear the same PFID. Packets are directed to a respective packet processor based on their specific classification. The packets are then sent on to the DTU described in FIG. 4, using the connection 560.

The header processor 520 and the classifier 530 are capable of receiving feedback information from the DTU indicating which packet has been dropped. By updating the respective references to the process flow in the units 520 and 530, specific actions are taken with regards to any packet received subsequent to a packet drop. Based on the programmer's choice, the information about a packet drop will result in immediately ceasing sending any further packets belonging to the same process flow, i.e., packets which have the same PFID as that of the dropped packet.

The system will resume sending packets of that process flow only after it identifies that the same packet that was indicated as dropped is retransmitted by the source. The system is further capable of distinguishing between the packets that flow upstream and downstream. Because of this, the differentiation between the source and the destination is clear at all times, preventing erroneous restart of the packet transmission.

In another embodiment, the system allows sending one more packet with the same PFID subsequent to a packet drop. In such a case, the destination node receives a packet out of sequence. The destination having such an out of sequence packet will respond promptly, thereby notifying the source of the problem. Therefore, the recovery from the congestive situation is faster. Only the retransmit of the dropped packet will cause the SAN-C system to allow the further transfer of packets having the same PFID.

In a further enhancement to this implementation, an out of order packet will not be sent, if a predefined time threshold has exceeded. The reason for that is that after such time the destination will respond autonomously with a request for a retransmit solely due to the fact that a time threshold has passed on its side. Therefore it is pointless to send this out of order packet after such time elapses.

In another embodiment, a Nack message, otherwise known as a non-acknowledge message, is sent to the source. The Nack message contains an indication of the packet sequence number of the discarded packet, identified by the RED system of choice. The source, then responds by retransmitting the discarded packet but in a reduced transmission rate. This effectively leads to a faster response to the request to reduce the load on the system on one hand, and on the other hand keeps the system performance at an overall higher level.

In yet another embodiment of this invention, the SAN-R is placed in a network of routers. If the SAN-R detects an acknowledgment packet from a destination containing a packet sequence number, it ceases transferring of packets from the source to the destination with a higher sequence number. This prevents the loading of the network between the detecting SAN-R and the destination, as no more packets which will be retransmitted anyway will be sent unnecessarily to the destination. The SAN-R resumes sending the packets when its SAN-C unit detects the retransmit of a packet with the same PFID and that has the correct packet sequence number.

The method and apparatus described herein provide for an immediate response when a RED operation takes place by the router. By doing this, the system is capable of responding efficiently and accurately when a congested situation occurs. With a retransmit load is in the range of 1–10% of the overall system load, the improvement by using the technique proposed in this invention is significant.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention, including but not limited to WRED systems.

What is claimed is:

1. A packet transfer apparatus for a network system said apparatus comprising:
   a packet receiver that accepts an input of packets from a first network segment;
   a packet classifier that classifies packets based on their respective process flows;
   a packet discarder to discard packets;
   a packet sender that sends packets to a second network segment; and
   a feedback mechanism between the packet discarder and the packet classifier wherein the packet classifier can be provided information regarding discarded packets,
   wherein the apparatus sends an acknowledgement packet, said acknowledgement being sent from a destination of the discarded packet to a source of the discarded packet, said acknowledgement containing a sequence number of the discarded packet
   wherein the apparatus measures an elapsed time between the discarding of the packet and a time immediately prior to receipt of the acknowledgment packet.

2. The apparatus of claim 1 wherein the apparatus sets a time threshold that is compared against the elapsed time.

3. The apparatus of claim 2 where the acknowledgment packet is not transferred when the time threshold is larger than the elapsed time.

4. The apparatus of claim 2 where the acknowledgment packet is transferred when the time threshold is equal to or smaller than the elapsed time.

5. A packet transfer apparatus for a network system said apparatus comprising:
   a packet receiver that accepts an input of packets from a first network segment;
   a packet classifier that classifies packets based on their respective process flows;
   a packet discarder to discard packets;
   a packet sender that sends packets to a second network segment; and
   a feedback mechanism between the packet discarder and the packet classifier wherein the packet classifier can be provided information regarding discarded packets,
   wherein the apparatus ignores an acknowledgment packet transmitted from a destination to a source requesting the retransmit of the discarded packet and measures an elapsed time between the discarding of the packet and a time immediately prior to receipt of the acknowledgment packet from the destination.

6. The apparatus of claim 5 wherein the apparatus sets a time threshold that is compared against the elapsed time.

7. The apparatus of claim 6 wherein a second packet is not transferred when the time threshold is larger than the elapsed time.

8. The apparatus of claim 6 wherein a second packet is transferred when the time threshold is equal to or smaller than the elapsed time.

9. A network system comprising:
   a plurality of terminal nodes;
   at least one packet transfer unit effectively connected between at least two of said terminal nodes,
   said at least one transfer unit further comprising a packet classifier that classifies packets into their respective process flows;
   a random early discarder (RED) of packets; and
   a feedback mechanism between the RED and the packet classifier wherein the packet classifier can be provided information regarding discarded packets,
   wherein the system sends an acknowledgement packet, said acknowledgement packet being sent from a destination of the discarded packet to a source of the discarded packet, said acknowledgement containing a sequence number of the discarded packet, and
   wherein the system measures an elapsed time between the discarding of the packet and a time immediately prior to receipt of the acknowledgment packet.

10. The network system of claim 9 wherein the system sets a time threshold that is compared against the elapsed time.

11. The network system of claim 10 where the acknowledgment packet is not transferred when the time threshold is larger than the elapsed time.

12. The network system of claim 10 where the acknowledgment packet is transferred when the time threshold is equal to or smaller than the elapsed time.

13. A network system comprising:
    a plurality of terminal nodes;
    at least one packet transfer unit effectively connected between at least two of said terminal nodes,
    said at least one transfer unit further comprising a packet classifier that classifies packets into their respective process flows;
    a random early discarder (RED) of packets; and
    a feedback mechanism between the RED and the packet classifier wherein the packet classifier can be provided information regarding discarded packets,
    wherein the system ignores an acknowledgment packet transmitted from the destination to the source requesting the retransmit of the discarded packet and measures an elapsed time between the discarding of the packet and a time immediately prior to receipt of an acknowledgment packet from the destination.

14. The network system of claim 13 wherein the system sets a time threshold that is compared against the elapsed time.

15. The network system of claim 14 wherein a second packet is not transferred when the time threshold is larger than the elapsed time.

16. The network system of claim 14 wherein a second packet is transferred when the time threshold is equal to or smaller than the elapsed time.

17. A method of transferring packets in a network comprising:
    accepting an input of packets from a first network segment;
    classifying the packets based on their process flows;
    providing a unique process flow identification (PFID) to packets belonging to a same process flow;

discarding at least a packet;

providing information to a packet classifier regarding the discarded packet;

stopping further transfer of packets having a same PFID as the discarded packet;

sending an acknowledgment packet to the source of the discarded packet, said acknowledgment containing a sequence number of the discarded packet; and measuring an elapsed time between the discard of the packet and a time immediately prior to receipt of the acknowledgment packet.

18. The method of claim 17 further comprising setting a time threshold time that is compared against the elapsed time.

19. The method of claim 18, further comprising not transferring the acknowledgment packet when the time threshold is larger than the elapsed time and transferring when the time threshold is equal to or smaller than the elapsed time.

* * * * *